United States Patent
Yabe et al.

(10) Patent No.: US 9,667,110 B2
(45) Date of Patent: May 30, 2017

(54) ROTOR OF PERMANENT MAGNET MOTOR HAVING AIR GAPS AT PERMANENT MAGNET END PORTIONS

(71) Applicants: Koji Yabe, Tokyo (JP); Naohiro Oketani, Tokyo (JP)

(72) Inventors: Koji Yabe, Tokyo (JP); Naohiro Oketani, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 67 days.

(21) Appl. No.: 14/350,818

(22) PCT Filed: Dec. 12, 2012

(86) PCT No.: PCT/JP2012/082211
§ 371 (c)(1),
(2) Date: Apr. 10, 2014

(87) PCT Pub. No.: WO2014/091579
PCT Pub. Date: Jun. 19, 2014

(65) Prior Publication Data
US 2015/0263574 A1 Sep. 17, 2015

(51) Int. Cl.
*H02K 1/27* (2006.01)

(52) U.S. Cl.
CPC ......... *H02K 1/276* (2013.01); *H02K 2213/03* (2013.01)

(58) Field of Classification Search
CPC ........ H02K 1/276; H02K 1/27; H02K 1/2706; H02K 1/2766; H02K 2201/03; H02K 2213/03

USPC ............ 310/156.53, 156.45, 156.56, 156.57, 310/156.38
See application file for complete search history.

(56) References Cited

U.S. PATENT DOCUMENTS

| 7,948,138 B2 | 5/2011 | Hattori et al. |
| 8,198,776 B2 | 6/2012 | Mathoy |
| 8,847,454 B2 | 9/2014 | Saito et al. |

(Continued)

FOREIGN PATENT DOCUMENTS

| CN | 101167230 A | 4/2008 |
| CN | 102598476 A | 7/2012 |

(Continued)

OTHER PUBLICATIONS

Machine translation of JP 2011097754 A (May 2011).*

(Continued)

*Primary Examiner* — Michael Andrews
(74) *Attorney, Agent, or Firm* — Posz Law Group, PLC

(57) ABSTRACT

A rotor of a motor includes a rotor core; permanent magnet insertion holes that are formed in an outer circumferential portion of the rotor core along a circumferential direction and in each of which an air gap extending in an outer circumferential direction, is formed in both end portions in a state where a permanent magnet is inserted; and a permanent magnet inserted in each of the permanent magnet insertion holes, wherein a thin portion is formed between the air gap and an outer circumference of the rotor core, rounded corner portions are formed at two locations on an outer circumference side in the air gap, and a radius of curvature of any one of the corner portions is equal to or more than half a width of the air gap in a circumferential direction.

7 Claims, 3 Drawing Sheets

(56) References Cited

U.S. PATENT DOCUMENTS

| | | | |
|---|---|---|---|
| 2004/0007930 A1* | 1/2004 | Asai | H02K 1/2746 310/156.53 |
| 2004/0217666 A1 | 11/2004 | Mellor et al. | |
| 2005/0040723 A1 | 2/2005 | Asai et al. | |
| 2007/0278886 A1* | 12/2007 | Fujiwara | H02K 1/276 310/156.53 |
| 2009/0079287 A1* | 3/2009 | Hattori | H02K 1/2766 310/156.53 |
| 2010/0308686 A1 | 12/2010 | Mathoy | |
| 2011/0241468 A1* | 10/2011 | Inagaki | H02K 1/2766 310/156.32 |
| 2012/0223607 A1 | 9/2012 | Uchiyama et al. | |
| 2012/0274168 A1* | 11/2012 | Holzner | H02K 1/246 310/156.53 |
| 2012/0274169 A1 | 11/2012 | Saito et al. | |
| 2013/0140922 A1 | 6/2013 | Yabe et al. | |
| 2013/0181567 A9 | 7/2013 | Holzner et al. | |

FOREIGN PATENT DOCUMENTS

| | | | |
|---|---|---|---|
| EP | 2458713 A1 | 5/2012 | |
| EP | 2498375 A1 | 9/2012 | |
| JP | 2003-324875 A | 11/2003 | |
| JP | 2004-201407 A | 7/2004 | |
| JP | 2004-236471 A | 8/2004 | |
| JP | 2006-311730 A | 11/2006 | |
| JP | 2010-088219 A | 4/2010 | |
| JP | 2011-015572 A | 1/2011 | |
| JP | 2011-097754 A | 5/2011 | |
| JP | 2011097754 A * | 5/2011 | H02K 1/27 |
| JP | 2012-186889 A | 9/2012 | |
| JP | 2012-217249 A | 11/2012 | |
| WO | 2011/055582 A1 | 5/2011 | |
| WO | 2012/004761 A1 | 1/2012 | |
| WO | 2012026032 A1 | 3/2012 | |

OTHER PUBLICATIONS

Office Action mailed Aug. 5, 2014 issued in corresponding JP patent application No. 2013-548690 (and English translation).
International Search Report of the International Searching Authority mailed Mar. 19, 2013 for the corresponding international application no. PCT/JP2012/082211.
Office Action issued Dec. 30, 2015 in the corresponding CN application No. 201280050473.1 (with partial English translation).
Office Action mailed Jul. 26, 2016 in the corresponding JP patent application No. 2015-174602 (with English translation).
Extended European Search Report dated Jul. 28, 2016 in the corresponding EP application No. 12886164.8.

* cited by examiner

ROTOR OF PERMANENT MAGNET MOTOR HAVING AIR GAPS AT PERMANENT MAGNET END PORTIONS

CROSS REFERENCE TO RELATED APPLICATION

This application is a U.S. national stage application of International Patent Application No. PCT/JP2012/082211 filed on Dec. 12, 2012.

TECHNICAL FIELD

The present invention relates to a rotor of a motor.

BACKGROUND

The rotor of an interior permanent magnet motor is such that permanent magnets are embedded in the rotor and the leakage flux from the permanent magnets is reduced by providing air gaps at the permanent magnet end portions. With this configuration, because the leakage flux is reduced as the width of the thin portions, which are present between the rotor outer circumference and the air gaps, in the radial direction becomes smaller, the rotor is often designed such that the width of the thin portions in the radial direction is as small as possible.

When the permanent magnets are present on the surface of the rotor, eddy current generated in the permanent magnets increases and thus the losses increase. Therefore, in some cases, the permanent magnets are embedded on the inner circumferential side of the rotor. In such a case, in order to reduce the width of the thin portions in the radial direction, the air gaps are each formed such that it extends in the rotor outer circumferential direction from the permanent magnet end portion.

In Patent Literature 1, in the rotor of the interior permanent magnet motor, stress concentration caused by the centrifugal force when the rotor is rotating is reduced by bending the air gaps at the permanent magnet end portions in the rotor inner circumferential direction.

PATENT LITERATURE

Patent Literature 1: Japanese Patent Application Laid-open 2010-088219

TECHNICAL PROBLEM

However, the problem with the rotor of the interior permanent magnet motor described above is that, when the width of the thin portions is reduced in the radial direction, the strength of the thin portions decreases. For example, the strength of the thin portions against the electromagnetic exciting force and centrifugal force while the motor is in operation decreases.

Moreover, when the rotor is configured such that the permanent magnets are embedded on the inner circumferential side of the rotor, the amount of rotor core that is present on the outer circumferential side with respect to the permanent magnets increases; therefore, there is a problem in that the centrifugal force increases and thus the stress applied to the thin portions increases, which results in reduction in strength.

Moreover, although the rotor of the interior permanent magnet motor described in Patent Literature 1 reduces stress concentration caused by the centrifugal force when the rotor is rotating, because the air gaps at both end portions of the permanent magnets are bent toward the rotor center, there is a problem in that the width of the thin portions, which are present between the air gaps and the rotor outer circumference, increases in the radial direction and thus leakage flux increases.

SUMMARY

The present invention has been achieved in view of the above and an object of the present invention is to provide a rotor of an interior permanent magnet motor capable of improving the strength of the thin portions by relieving the stress generated in the thin portions between the air gaps of the permanent magnet end portions and the rotor outer circumference.

In order to solve the above problems and achieve the object, a rotor of a motor according to the present invention includes a rotor core; a plurality of permanent magnet insertion holes that are formed in an outer circumferential portion of the rotor core along a circumferential direction and in each of which a permanent-magnet end-portion air gap, which extends in an outer circumferential direction, is formed in both end portions in a state where a permanent magnet is inserted; and a permanent magnet that is inserted in each of the permanent magnet insertion holes, wherein a thin portion is formed between the permanent-magnet end-portion air gap and an outer circumference of the rotor core, rounded corner portions, as a pair, are formed at two locations on an outer circumference side in the permanent-magnet end-portion air gap, and a radius of curvature of any one of the corner portions is equal to or more than half a width of the permanent-magnet end-portion air gap in a circumferential direction.

According to the present invention, an effect is obtained where the strength of the thin portions can be improved by relieving the stress generated in the thin portions between the air gaps of the permanent magnet end portions and the rotor outer circumference.

DETAILED DESCRIPTION

A rotor of a motor according to embodiments of the present invention will be explained below in detail with reference to the drawings. This invention is not limited to these embodiments.

Embodiment

Figure 1:
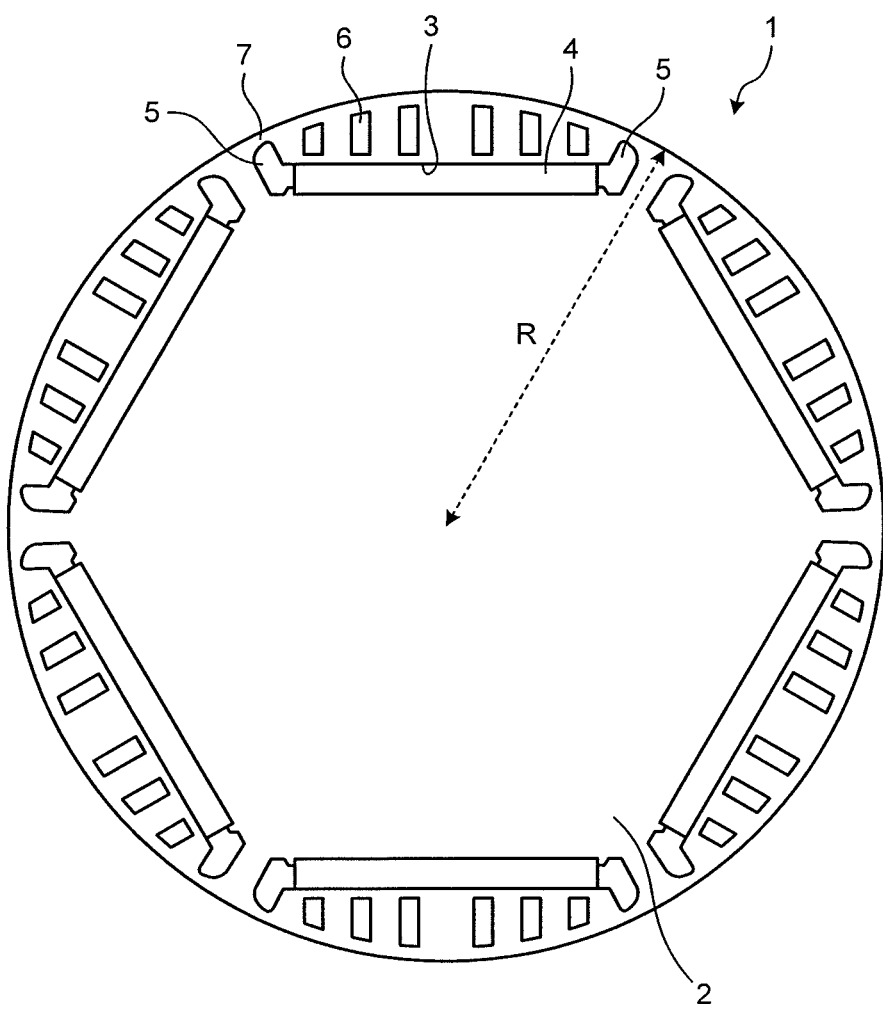
FIG. 1 is a transverse cross-sectional view of a rotor of an interior permanent magnet motor according to an embodiment.
Figure 2:
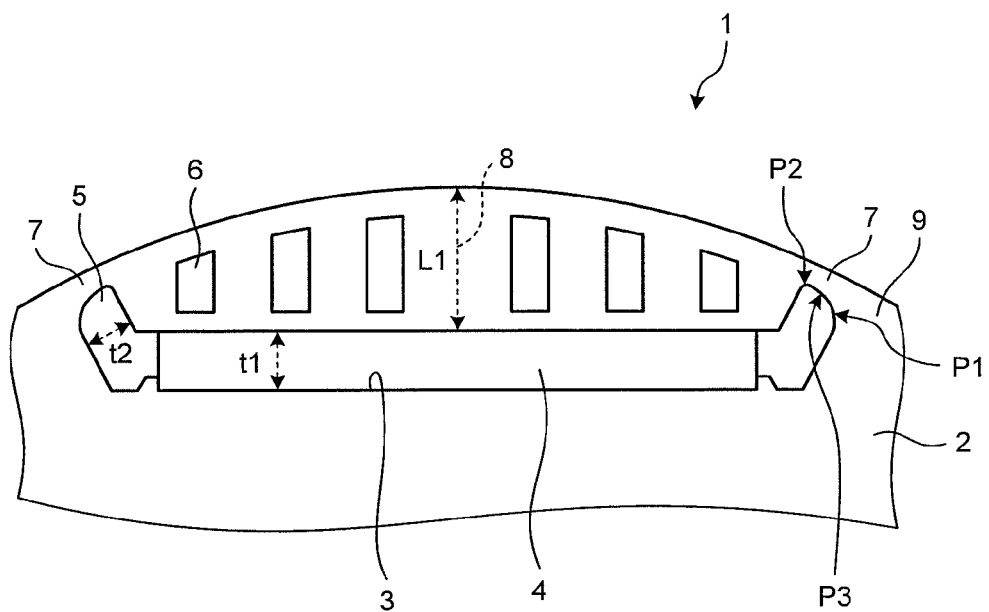
FIG. 2 is an enlarged view illustrating a magnetic pole portion in FIG. 1.

FIG. 1 is a transverse cross-sectional view of a rotor 1 of an interior permanent magnet motor according to the present embodiment and FIG. 2 is an enlarged view illustrating a magnetic pole portion in FIG. 1. The configuration of the rotor 1 will be explained below with reference to FIG. 1 and FIG. 2.

The rotor 1 includes a rotor core 2 and permanent magnets 4 embedded in the rotor core 2. The rotor 1 is rotatably arranged on the inner side of the stator (not illustrated).

The rotor core 2 has an approximately circular shape in transverse cross section. The rotor core 2 is formed, for example, by stamping out thin magnetic steel sheets with a metal die and laminating the magnetic steel sheets together.

In the outer circumferential portion of the rotor core 2, a plurality of (for example, six) permanent magnet insertion holes 3 are formed, for example, at approximately equal intervals along the circumferential direction. The permanent magnets 4 are inserted into the permanent magnet insertion holes 3. The permanent magnets 4 have, for example, a plate-like shape and the permanent magnet insertion holes 3 have a transverse cross-sectional shape corresponding to the shape of the permanent magnets 4. The permanent magnets 4 are arranged such that N poles and S poles are alternately arranged in the circumferential direction, thereby configuring the rotor 1 with six poles.

In the rotor core 2 on the outer circumferential side with respect to the permanent magnet insertion holes 3, a plurality of slits 6 are formed at predetermined intervals in the circumferential direction. For each magnetic pole, for example, the slits 6 are formed such that three slits 6 are formed on each of the right and left sides to be symmetrical about a magnetic pole center 8. The magnetic pole center 8 represents the center of the magnetic pole of each of the permanent magnets 4 in the circumferential direction or represents the center of each of the permanent magnet insertion holes 3 in the circumferential direction. An interpolar portion 9 represents a portion between magnetic poles of adjacent permanent magnets 4 or a portion between adjacent permanent magnet insertion holes 3.

An air gap 5 is formed in each of both end portions of each of the permanent magnet insertion holes 3 in a state where the permanent magnet 4 is inserted into the permanent magnet insertion hole 3. In other words, the air gaps 5 are part of the permanent magnet insertion hole 3 and form permanent-magnet end-portion air gaps. The air gaps 5 extend in the rotor outer circumferential direction from the end portions of the permanent magnets 4 and have an approximately constant width (width t2) in the circumferential direction. The rotor outer circumferential direction is the outer circumferential direction (radially outward) of the rotor core 2. As described above, each of the air gaps 5 is bent toward the outer circumferential side (outer diameter side) of the rotor core 2 with respect to a portion of the permanent magnet insertion hole 3, into which the permanent magnet 4 is inserted, and extends toward the outside along the radial direction of the rotor core 2. The air gaps 5 reduce leakage flux from the permanent magnets 4. Thin portions 7 are formed between the outer circumference of the rotor core 2 and the air gaps 5.

As described above, each of the air gaps 5 extends in the rotor outer circumferential direction and has rounded corner portions P1 and P2 at two locations on the outer circumferential side. The corner portion P1 has a rounded shape with a radius of curvature R1 and the corner portion P2 has a rounded shape with a radius of curvature R2. The corner portions P1 and P2 are also corner portions of each of the thin portions 7. In the present embodiment, the corner portions P1 and P2 satisfy $R1 \geq t2/2$ or $R2 \geq t2/2$, where t2 is the width of the air gaps 5 in the circumferential direction. In the example in the drawings, for example, $R1 > t2/2$ is satisfied. Accordingly, at the corner portion P1, the width of the thin portions 7 in the radial direction is larger than other portions.

When the rotor 1 rotates, the centrifugal force acts and stress is applied to the thin portions 7, which are present in the outer circumferential portion of the rotor core 2. The stress is concentrated at one point of each of the thin portions 7. Therefore, the width of the thin portions 7 in the radial direction is increased by increasing the radius of curvature of a portion closer to a portion on which stress is concentrated among the corner portions P1 and P2, whereby the stress generated in the thin portions 7 can be relieved and the strength thereof can be improved. Moreover, in some cases, the portion on which stress is concentrated extends to the position of t2/2, which is the center of each of the thin portions 7. In such a case, it is necessary to also relieve stress in the center of each of the thin portions 7. Because the corner portions P1 and P2 satisfy $R1 \geq t2/2$ or $R2 \geq t2/2$, the central side of each of the air gaps 5 between the corner portion P1 and the corner portion P2 can also be formed in an arc shape. Accordingly, it is possible to relieve the stress that extends to the central side and is generated in the thin portions 7.

Moreover, in the present embodiment, the corner portion P1 closer to the interpolar portion 9 and the corner portion P2 closer to the magnetic pole center 8 are such that $R1 > R2$ is satisfied. In other words, the curvature of radius R1 of the corner portion P1, which is closer to the interpolar portion 9, is larger. The position at which the stress is concentrated in each of the thin portions 7 is often generated in a portion near the interpolar portion, and in such a rotor, stress relief can be provided by satisfying $R2 < R1$.

Moreover, the shape between the corner portion P1 and the corner portion P2 of each of the air gaps 5 can be, for example, a curve. When a given point on the curve between the corner portion P1 and the corner portion P2 is indicated by P3 and the curvature of radius of the curve at the point P3 is indicated by R3, for example, $R2 < R3$ and $R1 < R3$ can be satisfied. When R3 is made larger than R1 and R2, a change in width of the thin portion 7 in the radial direction becomes small. Accordingly, it is possible to reduce the leakage flux leaking through the thin portions 7 from the permanent magnets 4 and thus magnetic flux can be effectively used.

The shape between the corner portion P1 and the corner portion P2 of each of the air gaps 5 can be a straight line. In this case, the wear on the metal die used for manufacturing the rotor core 2 is reduced compared with the case of a curve; therefore, the life of the metal die can be increased.

Moreover, when the shape between the corner portion P1 and the corner portion P2 of each of the air gaps 5 is a curve, it is possible to provide a region in which the width of the thin portion 7 in the radial direction is approximately constant in the circumferential direction. By providing a region with an approximately constant size in the radial direction in each of the thin portions 7, the leakage flux can be reduced and thus magnetic flux can be effectively used.

Moreover, it is possible to satisfy the relationship $0.1 \times R \leq L1$, where R is the (maximum) radius of the rotor core 2 and L1 is the embedding depth of the permanent magnets 4. The embedding depth L1 of the permanent magnets 4 is the distance from the outer circumferential surface of the rotor core 2 to the permanent magnets 4 in the magnetic pole center 8. When the embedding depth L1 of the permanent magnets 4 is large, the amount of core on the outer circumferential side of the permanent magnets 4 increases and thus the stress applied to the thin portions 7 increases; therefore, it is possible to use the present embodiment more effectively.

Moreover, the width t2 of the air gaps 5 in the circumferential direction can satisfy the relationship $t1 > t2$, where t1 is the thickness of the permanent magnets 4. When t2 is large, the thin portions 7 become large and stress is concentrated. Therefore, it is desirable that the size of t2 be smaller than the thickness t1 of the permanent magnets 4.

Figure 3:
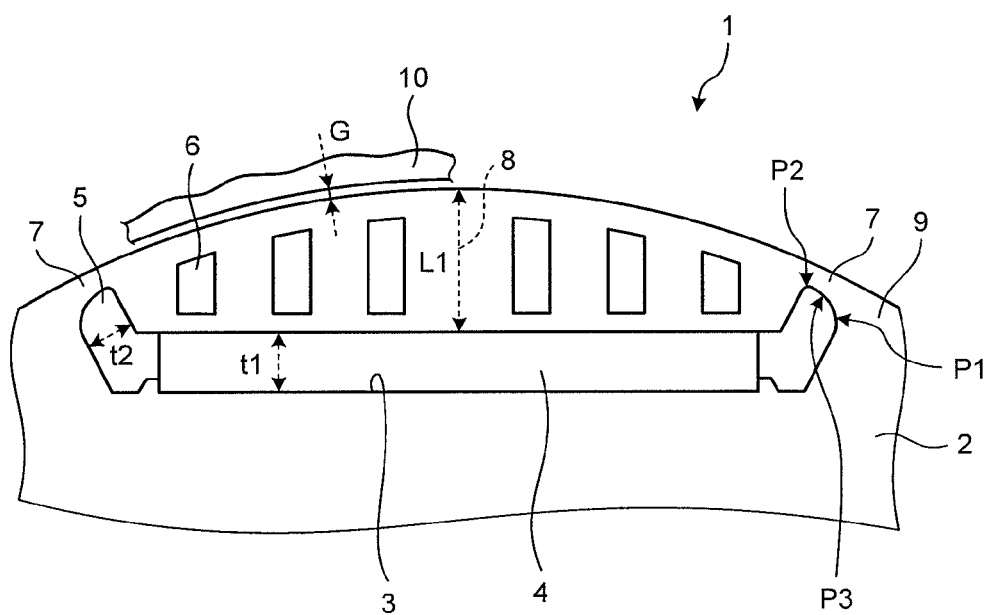
FIG. 3 is an enlarged view illustrating a magnet pole portion and part of stator teeth.

Moreover, 1.5×G≤t2 can be satisfied, where G indicates the size of the air gap, which is present between the tips of the stator teeth and the rotor 1, in the radial direction. When t2 is small, magnetic flux leakage occurs. Therefore, magnetic flux leakage can be reduced by setting t2 equal to or larger than, for example, 1.5 times the size of the air gap. FIG. 3 is an enlarged view illustrating a magnet pole portion and part of the stator teeth. In FIG. 3, part of stator teeth 10 and the size G of the air gap in the radial direction are illustrated in addition to the configuration illustrated in FIG. 2.

Figure 4:
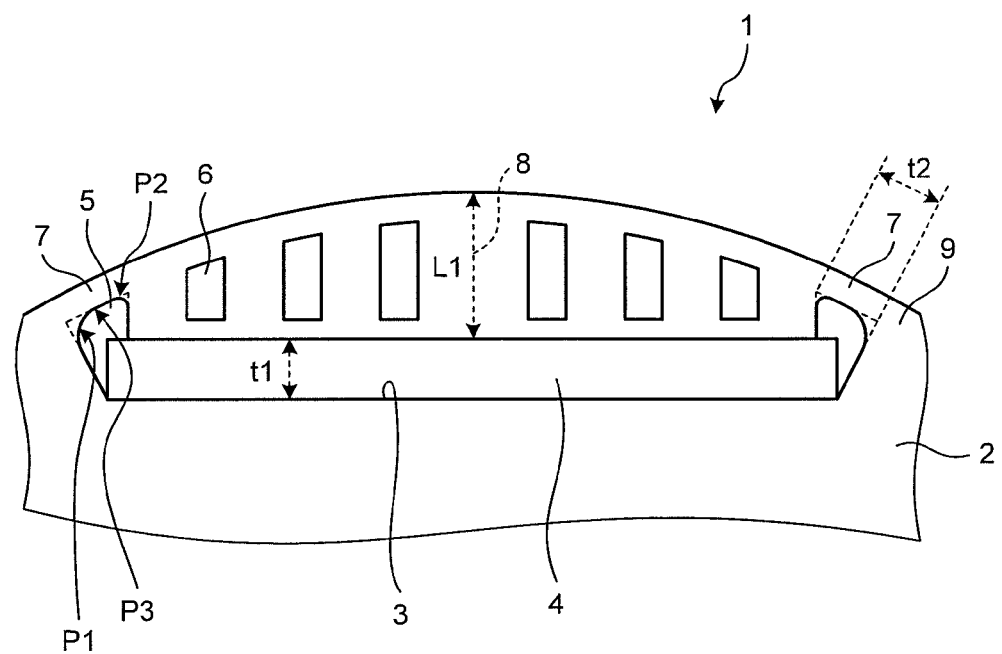
FIG. 4 is a transverse cross-sectional view of a rotor of an interior permanent magnet motor according to a modified example of the embodiment.

FIG. 4 is a transverse cross-sectional view of the rotor 1 of an interior permanent magnet motor according to a modified example of the present embodiment. In FIG. 4, the same components as those in FIG. 2 are denoted by the same reference numerals. As illustrated in FIG. 4, in the modified example, the air gaps 5 have a shape such that they expand as they approach the rotor outer circumference. In other words, each of the air gaps 5 is such that the shape on each of the magnetic pole center 8 side and the interpolar portion 9 side is approximately linear and its width in the circumferential direction increases toward the rotor outer circumference. Moreover, each of the air gaps 5 is such that the shape between the corner portion P1 and the corner portion P2 is approximately linear. With such a shape, t2 indicates the width in the circumferential direction between the intersection where the extension of a straight line of the air gap 5 on the interpolar portion 9 side and the extension of a straight line that is present between the corner portion P1 and the corner portion P2 meet and the intersection where the extension of a straight line of the air gap 5 on the magnetic pole center 8 side and the extension of a straight line that is present between the corner portion P1 and the corner portion P2 meet. When the shape between the corner portion P1 and the corner portion P2 is approximately an arc, t2 indicates the width in the circumferential direction between the intersection where the extension of a straight line of the air gap 5 on the interpolar portion 9 side and the extension of an arc that is present between the corner portion P1 and the corner portion P2 meet and the intersection where the extension of a straight line of the air gap 5 on the magnetic pole center 8 side and the extension of an arc that is present between the corner portion P1 and the corner portion P2 meet. When the shapes of the air gaps 5 on the interpolar portion 9 side or the magnetic pole center 8 side are all formed from an arc or the like, the maximum width of the air gaps 5 in the circumferential direction is indicated by t2. Moreover, the shape of each of the air gaps 5 present on the outer circumferential side of the rotor is formed from, for example, three or more curves or two or more curves and one straight line.

As described above, according to the present embodiment, it is possible to obtain the rotor 1 capable of improving the strength of the thin portions 7 by relieving the stress generated in the thin portions 7.

Moreover, according to the present embodiment, it is possible to obtain a motor including the rotor 1 and an electrical device (for example, a compressor in a refrigeration cycle device, a blower in an air conditioner, or the like) on which the motor is mounted.

In the present embodiment, the rotor 1 has a circular shape; however, it is not limited thereto and the rotor 1 can have, for example, an elliptical shape. Moreover, the number of magnetic poles may be any number other than six. In any case, an effect similar to the present embodiment is obtained.

Moreover, in the present embodiment, the slits 6 are provided on the outer circumferential side of the permanent magnets 4. The slits 6 are used for reducing harmonics of the induced voltage and reducing torque ripple. By providing the slits 6 in such a manner in the outer circumferential portion of the rotor core 2, the effect can be further improved. In other words, because the slits 6 are air gaps and thus lighter than the rotor core 2, the effect of centrifugal force can be reduced.

Other effects of the present embodiment are as explained above.

INDUSTRIAL APPLICABILITY

As described above, the present invention is useful as a rotor of an interior permanent magnet motor.

The invention claimed is:

1. An electrical device on which a motor is mounted, comprising:
   a rotor core that has an outer circumference and an outer circumferential portion;
   a plurality of permanent magnet insertion holes that are formed in the outer circumferential portion of the rotor core along a circumferential direction, each of the plurality of permanent magnets insertion holes including two end portions;
   a permanent-magnet end-portion air gap which extends in an outer circumferential direction, that is located in each of the plurality of permanent magnet insertion holes at the two end portions in a state where a permanent magnet is inserted into each of the plurality of permanent magnet insertion holes, that extends in an outer circumferential direction, and that has an outer circumference side, a width, and a parallel portion that includes a first side parallel to a second side opposite of the first side of the permanent-magnet end-portion air gap, that extends toward an outer circumference of the rotor core in a radial direction of the rotor core, and that is defined by the width of the permanent-magnet end-portion air gap;
   a permanent magnet that is inserted in each of the plurality of permanent magnet insertion holes, and that has a thickness in a radial direction of the rotor core greater than the width of the permanent-magnet end-portion air gap in a circumferential direction;
   a thin portion formed between the permanent-magnet end-portion air gap and the outer circumference of the rotor core; and
   rounded corner portions, as a pair, formed at two locations on the outer circumference side in the permanent-magnet end-portion air gap, each of the rounded corner portions has a radius of curvature equal to or greater than half the width of the permanent-magnet end-portion air gap in the circumferential direction.

2. The electrical device on which a motor is mounted according to claim 1, wherein a radius of curvature of one of the corner portions closer to an interpolar portion is larger than a radius of curvature of another of the corner portions closer to a magnetic pole center.

3. The electrical device on which a motor is mounted according to claim 1, wherein
   a shape between the corner portions of the permanent-magnet end-portion air gap is a curve, and a radius of curvature of the curve between the corner portions is larger than a radius of curvature of any of the corner portions.

4. The electrical device on which a motor is mounted according to claim 1, wherein a shape between the corner portions of the permanent-magnet end-portion air gap is a straight line.

5. The electrical device on which a motor is mounted according to claim 1, wherein the thin portion includes a region in which a width in a radial direction is constant in a radial direction.

6. The electrical device on which a motor is mounted according to claim 1, wherein an embedding depth of the permanent magnet is 0.1 times or more a maximum radius of the rotor core.

7. The electrical device on which a motor is mounted according to claim 1, wherein a width of the permanent-magnet end-portion air gap in a circumferential direction is 1.5 times or more a size of an air gap, which is present between a tip of stator teeth and the rotor, in a radial direction.

* * * * *